(12) United States Patent
Sultana et al.

(10) Patent No.: US 10,677,100 B2
(45) Date of Patent: Jun. 9, 2020

(54) HANDLING FITTING WITH MOVABLE JAWS FOR A TURBOMACHINE CASING

(71) Applicant: SAFRAN AIRCRAFT ENGINES, Paris (FR)

(72) Inventors: Patrick Sultana, Moissy-Cramayel (FR); Sébastien Jean Laurent Prestel, Moissy-Cramayel (FR); Olivier Renon, Moissy-Cramayel (FR); Benoit Argémiro Matthieu Debray, Moissy-Cramayel (FR); Guillaume Sevi, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 16/304,796

(22) PCT Filed: May 19, 2017

(86) PCT No.: PCT/FR2017/051235
§ 371 (c)(1),
(2) Date: Nov. 27, 2018

(87) PCT Pub. No.: WO2017/203139
PCT Pub. Date: Nov. 30, 2017

(65) Prior Publication Data
US 2019/0338678 A1 Nov. 7, 2019

(30) Foreign Application Priority Data
May 27, 2016 (FR) ...................................... 16 54825

(51) Int. Cl.
*F16M 13/00* (2006.01)
*F01D 25/28* (2006.01)
(Continued)

(52) U.S. Cl.
CPC .............. *F01D 25/285* (2013.01); *B64F 5/50* (2017.01); *F16M 13/02* (2013.01); *F05D 2230/68* (2013.01); *F05D 2260/02* (2013.01)

(58) Field of Classification Search
CPC ... F16M 7/00; F16M 5/00; F16M 1/00; F01D 25/28
(Continued)

(56) References Cited

U.S. PATENT DOCUMENTS 3,762,671 A * 10/1973 Schulz ................. B60K 5/1283
267/140.2
6,789,774 B2 * 9/2004 Painchaud ............. A45B 25/12
248/229.14
(Continued)

FOREIGN PATENT DOCUMENTS

FR 3018773 9/2015

OTHER PUBLICATIONS

International Patent Application No. PCT/FR2017/051235, International Search Report and Written Opinion dated Aug. 28, 2017, 16 pgs.

*Primary Examiner* — Steven M Marsh
(74) *Attorney, Agent, or Firm* — Lathrop GPM LLP

(57) ABSTRACT

A support system (16) for a structural casing of a turbomachine (10), which comprises:
  a handling fitting (17) comprising a front edge (19) provided with one or more hole(s) (26) for receiving one or more screw(s) (24) for attachment to a flange (23) formed on the casing (10), a rear edge (20) provided with a cavity (32) for receiving a projecting boss (29) formed on the casing (10);
  a pair of jaws (31) for gripping the boss (29), that are mounted in the cavity (32);
(Continued)

at least one screw (33) for adjusting the position of the jaws (31), mounted on the fitting (17) and engaging with at least one jaw (31).

12 Claims, 4 Drawing Sheets

(51) Int. Cl.
*B64F 5/50* (2017.01)
*F16M 13/02* (2006.01)

(58) Field of Classification Search
USPC ....... 248/637, 640, 554, 316.1, 316.2, 316.6
See application file for complete search history.

(56) References Cited

U.S. PATENT DOCUMENTS 7,708,736 B2 * 5/2010 Mullaney ............. A61B 17/645
 403/385
8,573,576 B2 * 11/2013 Clark ........................ B25B 5/04
 269/157

\* cited by examiner

HANDLING FITTING WITH MOVABLE JAWS FOR A TURBOMACHINE CASING

CROSS-REFERENCE TO RELATED APPLICATIONS

This application is a 35 U.S.C. § 371 filing of International Application No. PCT/FR2017/051235, filed May 19, 2017, which claims the benefit of priority to French Patent Application No. 1654825, filed May 27, 2016, each of which is incorporated herein by reference in its entirety.

The invention relates to the field of turbojet engines, in particular those intended to equip aircrafts. It more particularly relates to a support system for a structural casing for such a turbojet engine, designed to facilitate the transport or maintenance operations of the turbojet.

The following description refers to a support system mounted on an exhaust casing but this system can easily be mounted on any type of casings.

In this description, the words front and rear used to describe edges, faces or sections of mechanical parts of the system make it possible to distinguish the different areas of these parts and their positions must be considered with reference to the drawings.

As is well known, turbojets, and more particularly turbofan engines, are equipped with a structural exhaust casing and an intermediate casing, one function of which is to support the engine assembly on a transport trolley in assembly or maintenance workshops and during any transport operations such as delivery by truck, for instance. This function is carried out using handling fittings, in which male parts of the trolley are fixed, as described in the French patent application FR 3 018 773 (Snecma).

These handling fittings support high axial, radial and vertical forces. Attaching such fittings to the casing using simple screws, which are not ideally oriented to ensure a good distribution of the above-mentioned forces, is known. One aim of the invention is therefore to improve the distribution of forces in handling fittings.

To this end, a support system for a structural exhaust casing of a turbomachine is proposed, which comprises:
- a handling fitting comprising a front edge provided with one or more hole(s) for receiving one or more screw(s) for attachment to a flange formed on the casing, a rear edge provided with a cavity for receiving a projecting boss formed on the casing. The boss and the casing form a single piece.
- a pair of jaws for gripping the boss, that are mounted in the cavity;
- at least one screw for adjusting the position of the jaws, mounted on the fitting and engaging with at least one said jaw.

Also concerned is a connecting assembly comprising a structural casing of a turbomachine provided with a casing support system as mentioned above, which thus comprises:
- a handling fitting comprising a front edge provided with one or more hole(s) for receiving one or more screw(s) for attachment to a flange formed on the casing, a rear edge provided with a cavity for receiving a projecting boss formed on the casing;
- a pair of jaws, for gripping the boss, that are mounted in the cavity;
- at least one screw for adjusting the position of the jaws, mounted on the fitting and engaging with at least one said jaw.

Various additional features can be provided, either alone or in combination. Thus:

- the jaws have, for example, oblique front faces, which can be supported against bevelled bearing faces formed on the boss;
- the system includes, for example, a pair of screws for adjusting the jaws, mounted on either side of the fitting;
- each adjusting screw can have a mushroom-shaped end, which engages with a T-shaped groove provided in a rear face of one said jaw;
- the or each adjusting screw comprises, for example, a body housed in a hole provided in a side edge of the fitting;
- each jaw can be provided with a groove which engages with a pin protruding from a bearing face of the boss;
- the system includes, for example, screws for attaching the fitting to the flange, which jointly pass through holes formed in the flange and holes provided in a front edge of the fitting.
- the system can have nuts that helically engage with the attachment screws by being housed in windows provided in the fitting in the vicinity of the front edge thereof.

Further objectives and advantages of the invention will become apparent from the following description made in reference to the appended drawings, wherein.

Figure 1:
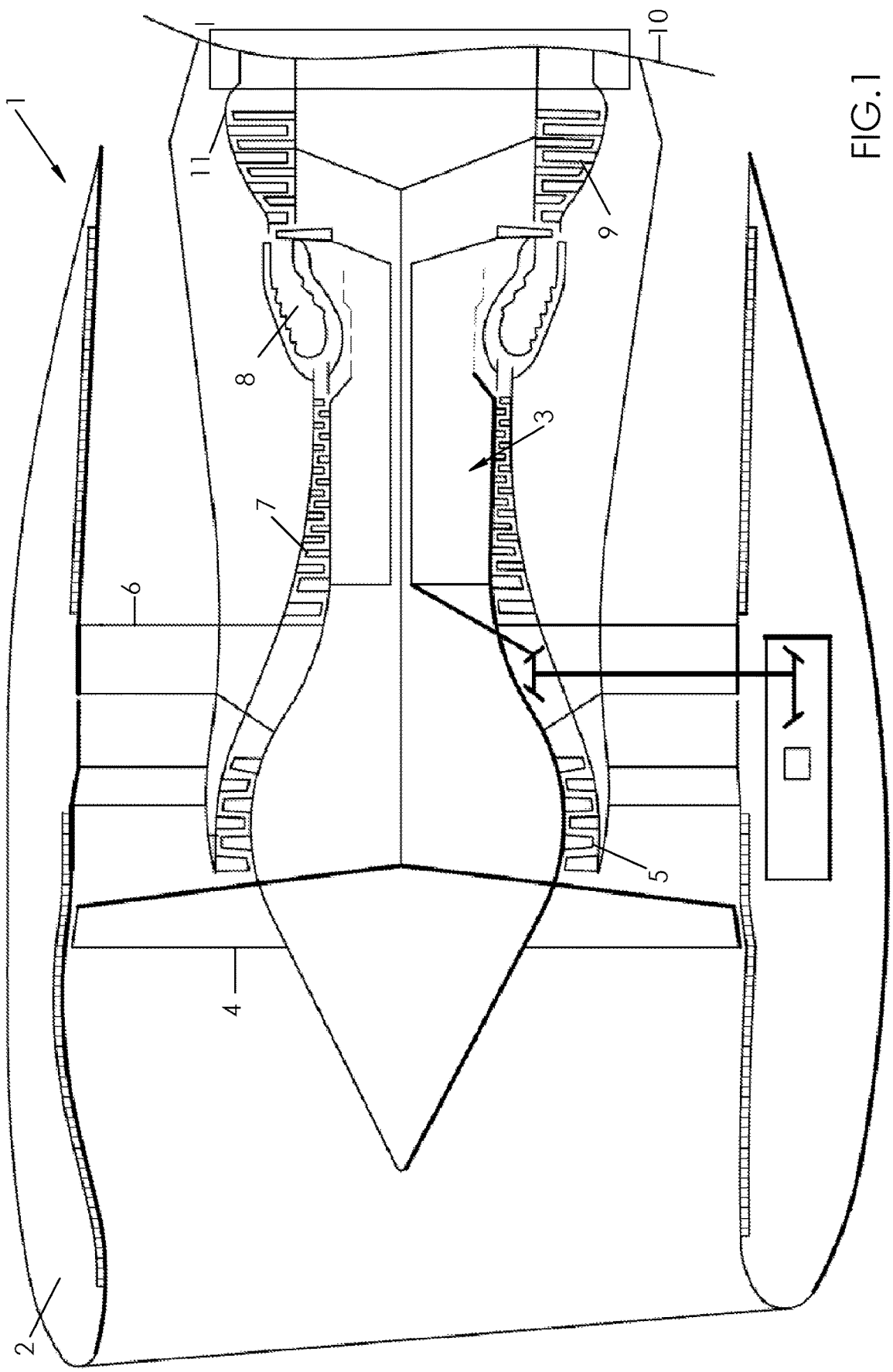
FIG. 1 is a schematic sectional view of a turbofan engine.

In FIG. 1, a double flow turbomachine 1 is shown in cross-section. This turbomachine 1 has a cylindrical nacelle 2, a turbojet 3 housed in the nacelle, and a fan wheel 4 mounted upstream of the turbojet 3. In the downstream direction, i.e. in the gas flowing direction, the turbine engine comprises a low pressure compressor 5, an intermediate case 6, a high pressure compressor 7, a combustion chamber 8, a high pressure turbine 9 and a low pressure turbine 10.

The intermediate casing 6 and the exhaust casing 10 are structural casings which allow, among other functions, to stiffen the turbomachine 1 to limit the deformations thereof during operation. The exhaust casing 10 is attached on a turbine casing 11, at a connecting area surrounded by a rectangle in FIG. 1.

Figure 2:
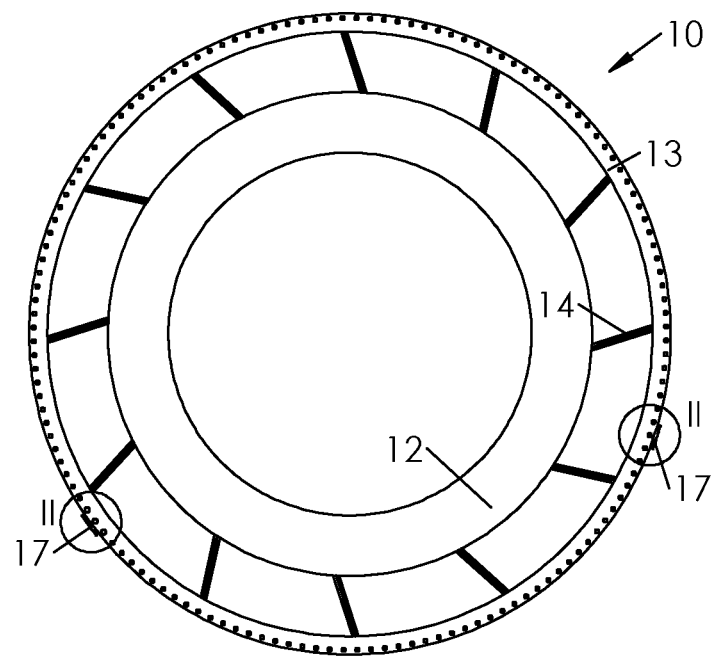
FIG. 2 is a schematic representation of the structural exhaust casing.
Figure 3:
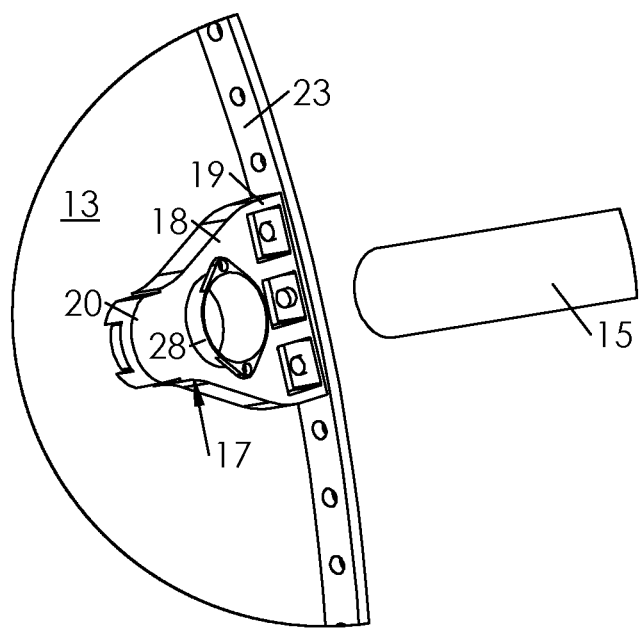
FIG. 3 is a larger scale exploded view of the support system and the male part of the handling trolley, taken from the FIG. 2 detail medallion II.
Figure 4:
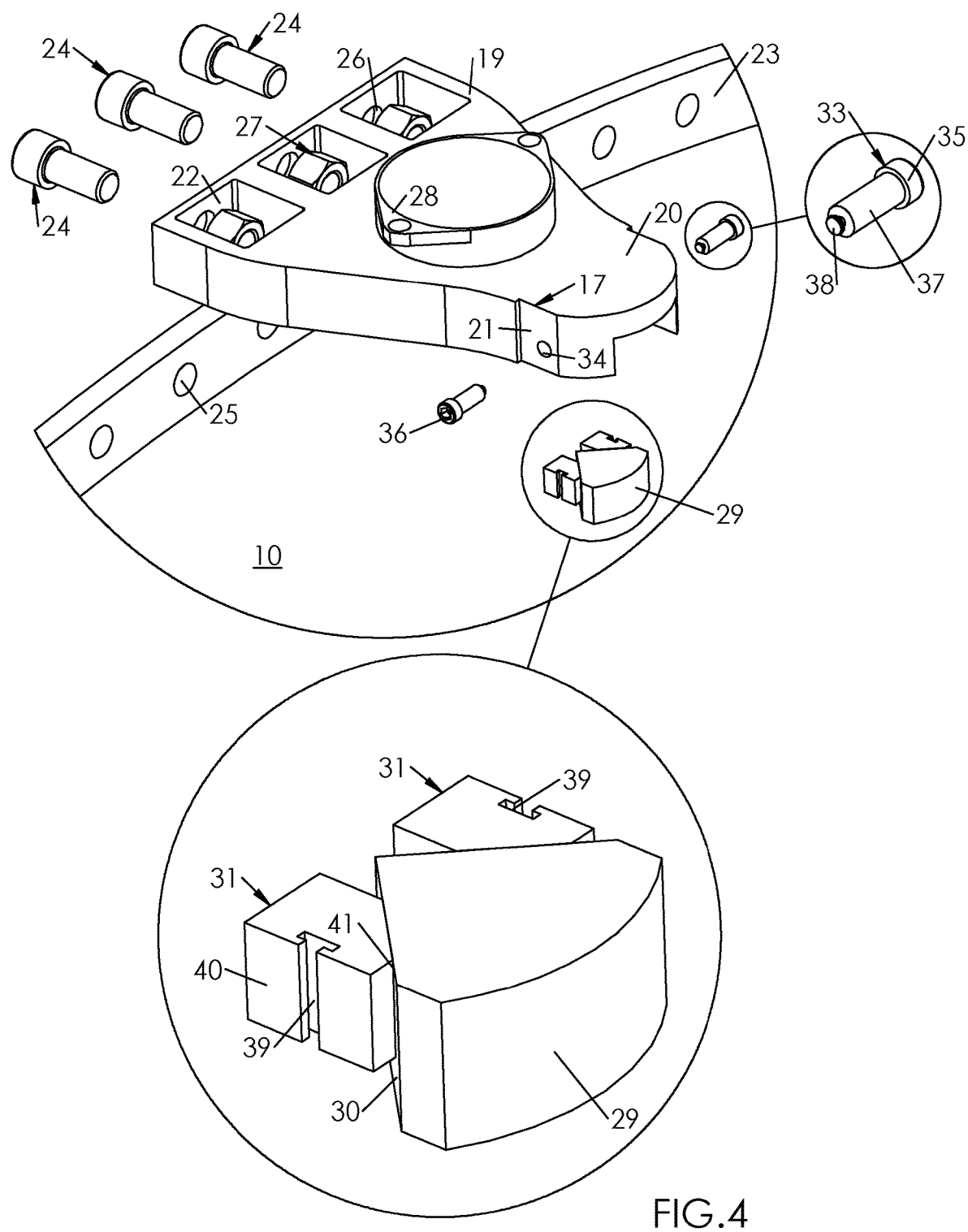
FIG. 4 is an exploded view of the movable jaw support system, according to an exemplary embodiment.

As shown in FIG. 2, the exhaust casing 10 comprises at least two coaxial shrouds, namely an inner shroud 12 and an outer shroud 13 arranged one inside the other and connected by substantially radial or slightly inclined arms 14.

During a transport operation of the turbomachine 1, it is held and positioned by means of a handling trolley equipped with support arms 15 which cooperate with a support system 16 associated with the casing 10, which supports all or part of the turbomachine 1.

This support system 16 first comprises, a pair of handling fittings 17, attached to the casing 10, on either side of the shroud 13. According to a preferred embodiment, illustrated in FIG. 2, the fittings 17 are arranged substantially diametrically opposite on the outer shroud 13, although angularly offset relative to the diameter. In the example shown in FIG. 2, the angular offset between the fittings 17, measured relative to the axis of the shroud 13, is about 135°.

Each fitting 17 comprises a body 18 with a roughly triangular shape, made in a single piece from a metallic material (e.g. titanium or stainless steel). As can be seen in particular in FIG. 5, the width of the body 18 decreases from a relatively wide front edge 19 to a comparatively narrower and advantageously rounded rear edge 20.

Figure 5:
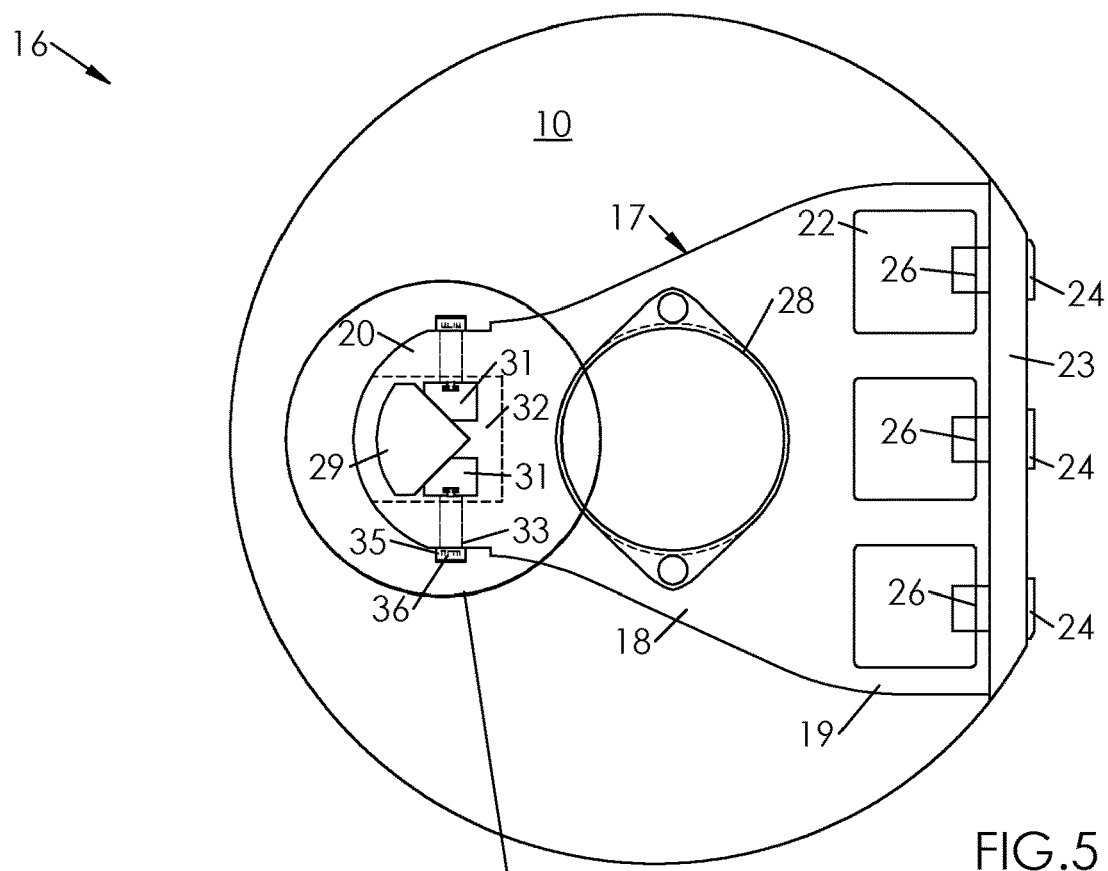
FIG. 5 represents a side view of the movable jaw support system, according to an exemplary embodiment.

According to a particular embodiment illustrated in the drawings, and in particular in FIG. 5, the body 18 of each fitting 17 has side edges 21 which, joining the front edge 19 and the rear edge 20, are not necessarily straight but may have curves.

As also shown in FIG. 5, each fitting 17 is provided, in the vicinity of the front edge 19, with windows 22 provided in the thickness of the body 18 to allow the fitting 17 to be attached to a flange 23 protruding from a front edge of the outer shroud 13.

According to a preferred embodiment shown in FIG. 5 the fitting 17 is attached to the flange 23 by means of screws 24 which jointly pass through holes 25 formed in the flange 23 and holes 26 provided in the front edge 19 of the body 18 in line with the windows 22. The screws 24 can be tightened by means of nuts 27 housed in windows 22 (FIG. 5). It is also possible to have no windows 22 or nuts 27 but a solid fitting with sleeves crimped inside the fitting.

Each fitting 17 also includes a barrel 28, which projects substantially radially from the body 18 and is designed to accommodate a support arm 15, the shape of which is complementary to it for this purpose. In the example shown, where the support arm 15 is cylindrical, the barrel 28 also forms a cylindrical bore.

The support system 16 also comprises:
- a boss 29 protruding from the exhaust casing 10 at a distance from the flange 23 and having two bevelled bearing faces 30 (spaced by an angle which, in the example shown, is close to a right angle), facing the flange 23;
- a tightening mechanism carried by the fitting 17.

The tightening mechanism comprises:
- a pair of jaws 31 mobile in translation, housed in a cavity 32 formed in the rear edge 20 of the body 18, and
- a pair of screws 33 for adjusting the position of the jaws 31.

Each screw 33 is inserted into a side hole 34 drilled in a side edge 21 of the body 18; it comprises a head 35, which protrudes from the hole 34 and has an indentation 36 suitable for receiving an operating tool such as a wrench, and a body 37, which extends from the head 35, through the hole 34, to a mushroom-shaped inner end 38.

As shown in the detail medallion of FIG. 5, the mushroom 38 of each screw 33 is housed in a 39 T-shaped section groove provided in a rear face 40 of the jaw 31, opposite an oblique front face 41 by which the jaw 31 is applied against a support face 30 of the boss 29. The groove 39 may have other shapes, such as a dovetail or a sphere or any other shape.

The fitting 17 is attached to the casing 10 as follows: The adjusting screws 33 are inserted into their holes 34, then the jaws 31 are inserted from below so that each groove 39 can accommodate a mushroom 38 of a screw 33. The assembly is then positioned on the casing 10 and the screws 33 are tightened using an operating tool such as a wrench.

Using the adjusting screws 33, the jaws 31 are spaced as far apart as possible so that they can be fitted onto the boss 29.

The fitting 17 is then mounted on the shroud 13, with the front edge 19 coming into contact with the flange 23 and the cavity 32 engaging with the boss 29, through the jaws 31 on either side of it.

The front edge 19 is secured to the flange 23 by means of the attachment screws 24 which jointly pass through the holes 25 and 26, and nuts 27 which, as they are housed in the windows 22, helically engage with the screws 24 to ensure the joint tightening of the flange 23 and the edge 19.

The adjustment screws 33 are then turned to tighten the jaws 31 against the boss 29, with the front faces 41 of the jaws 31 coming into contact with the support faces 30 and thus ensuring that the fitting 17 is locked by friction against the boss 29.

Although very rigid, such attachment of the fitting 17 on the casing 10 (and more precisely on the outer shroud 13 thereof) makes it possible to take up both axial (i.e. parallel to the axis of the shroud 13) and tangential (perpendicular to the axis of the shell 13) clearances required for mounting operations. Thus, the respective strokes of the jaws 31 may not be equal, since they depend on the clearance to be taken up.

With such an attachment, the fitting 17 is in embedded connection with the exhaust casing 10. The result is a good distribution of forces between the upstream screws 24 and the boss 29, which improves the behaviour of the parts.

The screws 24 provide partial transfer of axial, tangential and radial forces. The boss 29 and the jaws 31 ensure the transfer of the other part of such axial, tangential and radial forces.

Given the symmetry of the support systems 16 on either side of the outer shroud 13, the risk of the fittings 17 being pulled off by radial forces is low.

Figure 6:
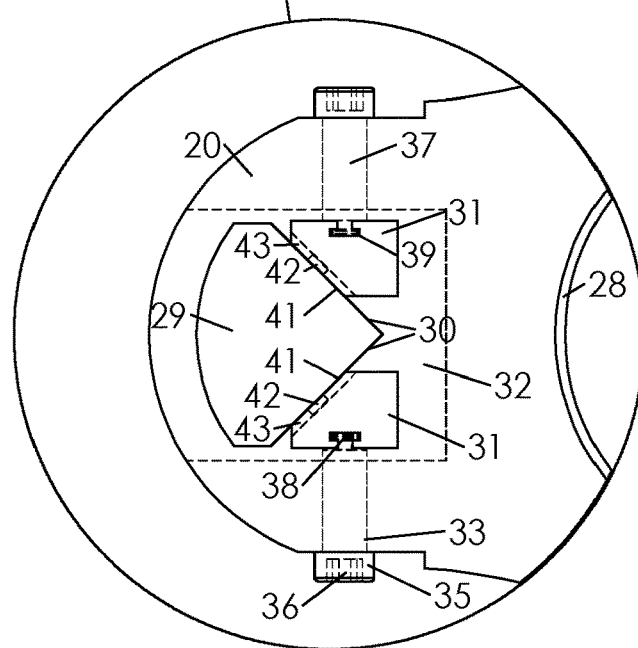
FIG. 6 represents a detailed view of the movable jaw support system, taken from the FIG. 5 detail medallion.

However, each support system 16 can be secured by, for example, providing the boss 29 with a pair of pins 42 protruding from the bearing faces 30, which are housed in grooves 43 provided in the jaws 31, as shown in dotted lines in FIG. 6. Doing the opposite, i.e. each bearing face 30 of boss 29 having a groove which engages with a pin protruding from one face 41 of a jaw 31 is possible, too.

Under the action of radial forces tending to tear off the fitting 17, the pins 42 come to abut against the edges of the grooves 43 and thus radially lock the jaws 31 (and therefore the fitting 17).

Alternatively, it is possible to secure the radial locking of the fitting 17 by means of a pin fastener which passes through both the fitting 17 and the boss 29.

To prevent any unintentional loosening of the adjusting screws 33, lock washers can be inserted between same and the body 18, or locknuts can be provided.

The invention claimed is:

1. A support system for a structural casing of a turbomachine, which comprises:
   a handling fitting comprising a front edge provided with one or more holes for receiving one or more screws for attachment to a flange formed on the casing, a rear edge provided with a cavity for receiving a projecting boss formed on the casing;
   a pair of jaws for gripping the boss, that are mounted in the cavity;
   at least one screw for adjusting the position of the pair of jaws, mounted on the fitting and engaging with at least one said jaw of the pair of jaws.

2. A system according to claim 1, characterized in that the pair of jaws have oblique front faces, which are adapted to rest against beveled bearing faces formed on the boss.

3. A system according to claim 1, characterized in that said at least one screw comprises a pair of screws for adjusting the pair of jaws, mounted on either side of the fitting.

4. A system according to claim 2, characterized in that said at least one screw comprises a pair of screws for adjusting the pair of jaws, mounted on either side of the fitting.

5. A system according to claim 1, characterized in that said at least one screw comprises a mushroom-shaped end, which engages with a groove provided in a rear face of one said pair of jaws.

6. A system according to claim 1, characterized in that said at least one screw comprises a body housed in a hole provided in a side edge of the fitting.

7. A system according to claim 1, characterized in that each jaw of the pair of jaws is provided with a groove which engages with a pin protruding from a bearing face of the boss.

8. A system according to claim 1, characterized in that each bearing face of the boss is provided with a groove which engages with a pin protruding from a face of one said jaw of the pair of jaws.

9. A system according to claim 1, characterized in that the attachment screws jointly pass through holes formed in the flange and holes in a front edge of the fitting.

10. A system according to claim 8, characterized in that it comprises nuts which helically engage with said one or more screws by being housed in windows provided in the fitting in the vicinity of the front edge thereof.

11. A system according to claim 8, characterized in that the fitting has sleeves crimped inside said fitting, in the vicinity of the front edge thereof, which helically engage with said one or more screws.

12. A connecting assembly comprising a structural casing of a turbomachine provided with a support system of a turbomachine, which comprises:
- a handling fitting comprising a front edge provided with one or more hole(s) for receiving one or more screw(s) for attachment to a flange formed on the casing, a rear edge provided with a cavity for receiving a projecting boss formed on the casing;
- a pair of jaws for gripping the boss, that are mounted in the cavity;
- at least one screw for adjusting the position of the jaws, mounted on the fitting and engaging with at least one said jaw of the pair of jaws.

\* \* \* \* \*